US006450480B2

(12) United States Patent
Massile

(10) Patent No.: US 6,450,480 B2
(45) Date of Patent: *Sep. 17, 2002

(54) BAKE CARBON FLUE STRAIGHTENER

(75) Inventor: Michael Massile, Pt. Pleasant, WV (US)

(73) Assignee: Century Aluminum Company, Monterey, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,204

(22) Filed: Oct. 15, 1998

Related U.S. Application Data

(62) Division of application No. 08/798,698, filed on Feb. 12, 1997, now Pat. No. 6,199,277.

(51) Int. Cl.[7] .............................. B66F 3/24; B23P 6/00

(52) U.S. Cl. ................................ 254/93 R; 29/402.01; 29/890.031; 52/749.15; 72/392

(58) Field of Search ......................... 29/402.1, 890.031, 29/890.145, 897.1, 283.5; 52/749.15; 72/392, 394; 269/266; 254/93 R

(56) References Cited

U.S. PATENT DOCUMENTS 1,178,020 A * 4/1916 Leonard .................... 269/266
2,352,703 A * 7/1944 Fries, Jr. ..................... 72/392
2,932,889 A * 4/1960 Kritscher ..................... 72/392
3,335,573 A * 8/1967 Ward ............................ 61/41
3,404,533 A * 10/1968 Brunton ......................... 61/41
3,697,047 A * 10/1972 Cruse ......................... 254/141
4,021,905 A 5/1977 Benton et al. ............ 29/401 R
4,453,863 A * 6/1984 Sutton et al. ................. 45/282
4,787,781 A * 11/1988 Bradberry .................. 405/282
4,803,881 A * 2/1989 Dudley ........................ 72/392
4,990,220 A 2/1991 Nashan et al. ............. 202/139
5,398,535 A * 3/1995 Giffin .......................... 72/392
5,690,315 A * 11/1997 Thomas .................... 254/93 R
5,722,646 A * 3/1998 Soderberg et al. ............ 269/20
5,839,239 A * 11/1998 Jang .......................... 52/123.1
6,000,260 A * 12/1999 Price et al. .................. 72/17.2

* cited by examiner

*Primary Examiner*—David P. Bryant
(74) *Attorney, Agent, or Firm*—Stephen E. Baldwin

(57) ABSTRACT

The present invention provides a bake carbon flue straightener for straightening a flue wall of an anode baking surface from a deformed or bowed position to a straight or normal position. The flue straightener includes a plurality of remotely controlled and independently actuated hydraulic cylinders mounted on a plurality of elevations space apart at equal distances from each other, a steel frame for supporting hydraulic cylinders, such that each of the elevations of the hydraulic cylinders are coupled to a continuous length of extendable solid push plates for extending the push plates to the deformed or bowed flue wall so as to push or straighten with equally distributed forces the deformed or bowed flue wall back to the straight or normal position.

8 Claims, 5 Drawing Sheets

FIGURE 1A
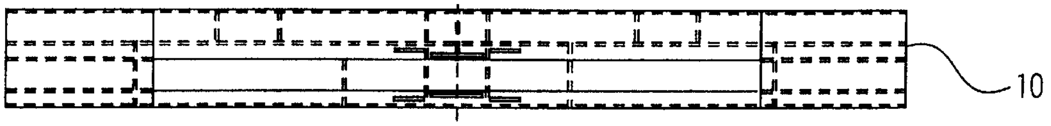
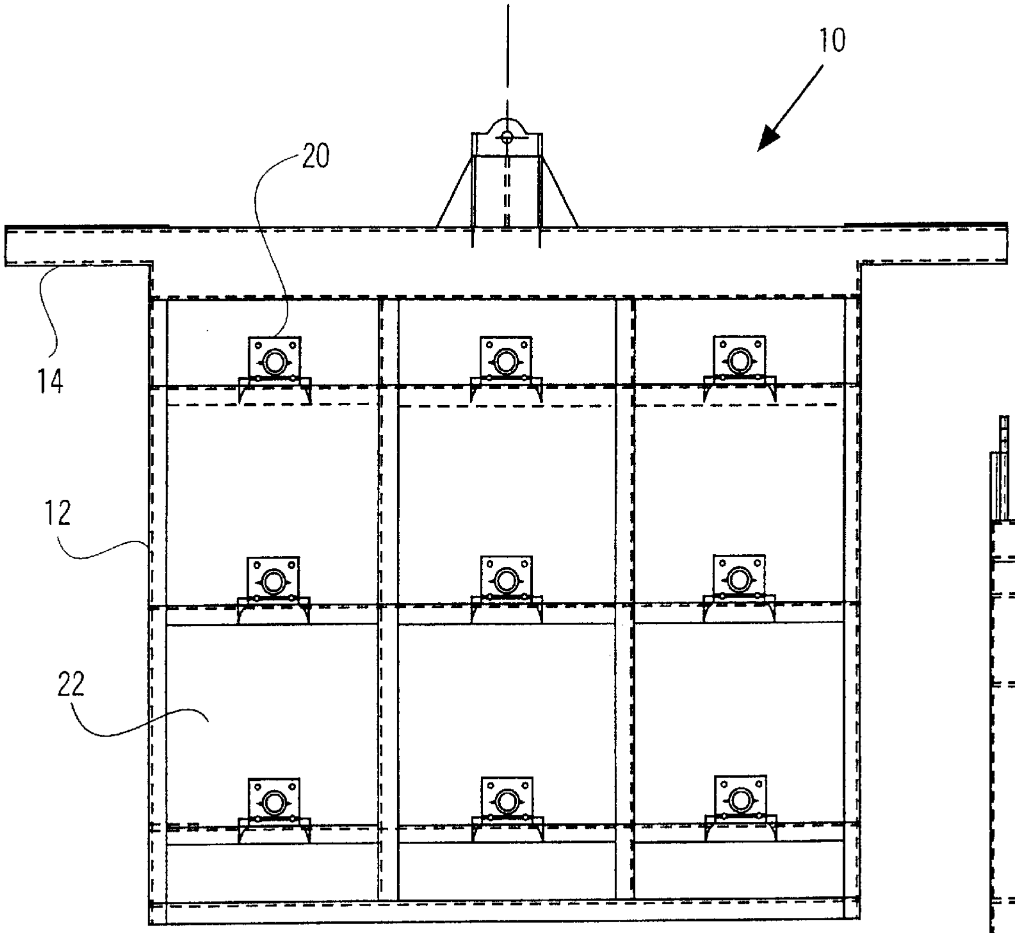
FIGURE 1B
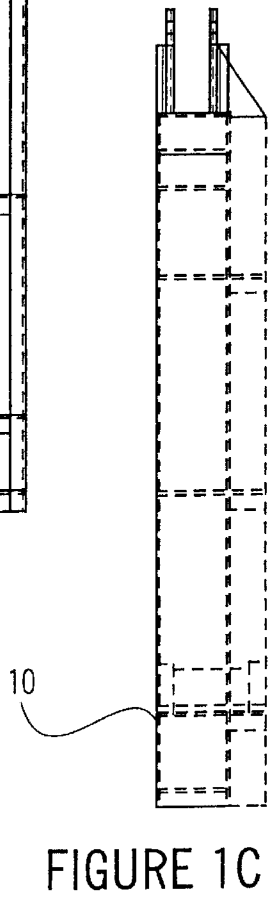
FIGURE 1C

PUSH-PLATE ADAPTER
9 EACH REQUIRED FOR STRAIGHTENER

BAKE CARBON FLUE STRAIGHTENER

This application is a divisional application of Ser. No. 08/798,698, filed Feb. 12, 1997, now U.S. Pat. No. 6,199, 277.

BACKGROUND OF THE INVENTION

The present invention relates to a bake carbon flue straightener for use in straightening the flue wall of an anode baking furnace. A problem which can occur with anode baking furnaces is that during operation the flue wall can exhibit bending or bowing due to external forces.

U.S. Pat. No. 4,021,905 describes a method of straightening the flue walls in a carbon anode ring furnace. The '905 patent discloses a method of straightening a flue wall by interposing a hydraulic jack between closely spaced brick flue walls and actuating the jack to apply opposing forces to the wall. The jack is positioned and actuated in a number of locations corresponding to a predetermined circular pattern about a deformation zone to reduce the deviation of bricks of the deformation zone. A tie brick is thereafter inserted between the flue walls to maintain normal spaced relation.

U.S. Pat. No. 4,990,220 discloses a coking reactor wherein coking blends are fed batchwise through the reactor whereby the reactor is heated through adjustable heating installations over the flue walls bordering the reactor chamber on both sides. As pointed out in the '220 patent, damages due to swelling are excluded altogether, as rigid lateral walls prevent the flue walls from being displaced.

In view of the foregoing, it would be desirable to provide an improved flue wall straightener for straightening the flue wall of an anode baking surface where bowing or bending of the flue wall has occurred.

SUMMARY OF THE INVENTION

It is an object of the present invention to provide an improved bake carbon flue straightener.

In one preferred embodiment, the present invention provides a bake carbon flue straightener for straightening a flue wall of an anode baking surface from a deformed or bowed position to a straight or normal position.

The flue straightener includes a plurality of remotely controlled and independently actuated hydraulic cylinders mounted on a plurality of elevations space apart at equal distances from each other and a steel frame for supporting the hydraulic cylinders. Each of the elevations of the hydraulic cylinders are coupled to a continuous length of extendable solid push plates for extending the push plates to the deformed or bowed flue wall so as to push or straighten with equally distributed forces the deformed or bowed flue wall back to straight or normal position.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 1A–1C show top, front and side views, respectively, of the bake carbon flue straightener according to the present invention.

DETAILED DESCRIPTION OF THE PREFERRED EMBODIMENTS

Figure 2:
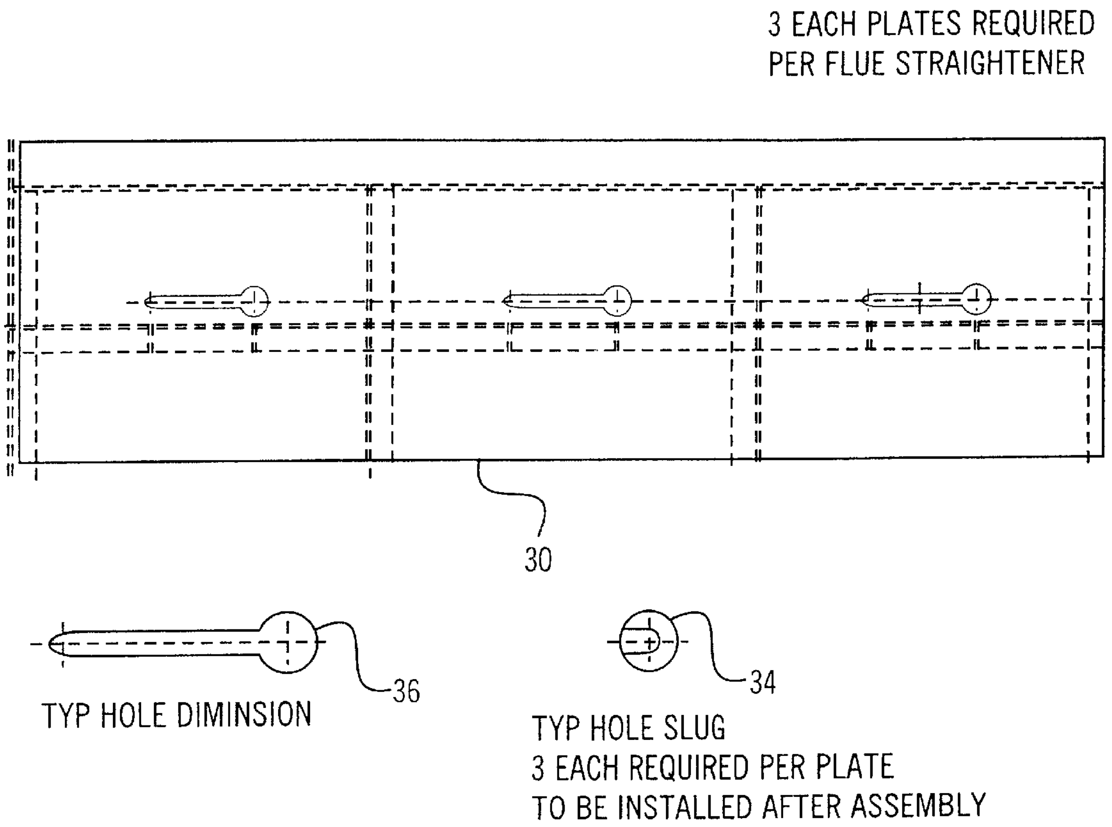
FIG. 2 shows a front view of a push plate as utilized with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

FIGS. 1A–1C show top, front and side views, respectively, of the bake carbon flue straightener 10 according to the present invention. The flue straightener 10 according to the present invention is a device which is used to straighten the flue walls of an anode baking furnace which are exhibiting bending or bowing due to external forces. The main structure 12 of the flue straightener 10 is a fabricated structural steel frame which is supported by the headwalls and suspends, in one embodiment, to within six (6) inches of the bottom and within ten (10) inches of the headwall on either side for clearance purposes. The flue straightener 10 includes an affixed lifting assembly 14 on the top portion so that the straightener 10 can be placed into position by an overhead crane (not shown) via the lifting assembly 14.

One function of the straightener structure 12 is to support nine (9) hydraulic cylinders 20, each of which are typically bolted to the straightener 10. The cylinders are mounted on three (3) elevations 22 and are spaced apart at equal distances. The cylinders are controlled by a remote mounted self-contained unit. Each cylinder function is independently actuated through a metered self-centering hydraulic valve.

FIG. 2 shows a front view of a push plate 30 according to the present invention. In one embodiment, there are three push plates 30 utilized with the flue straightener 10. Each elevation (or horizontal row) 22 of cylinders 20 is coupled to a continuous length of solid metal push plates 30.

Figure 3A:
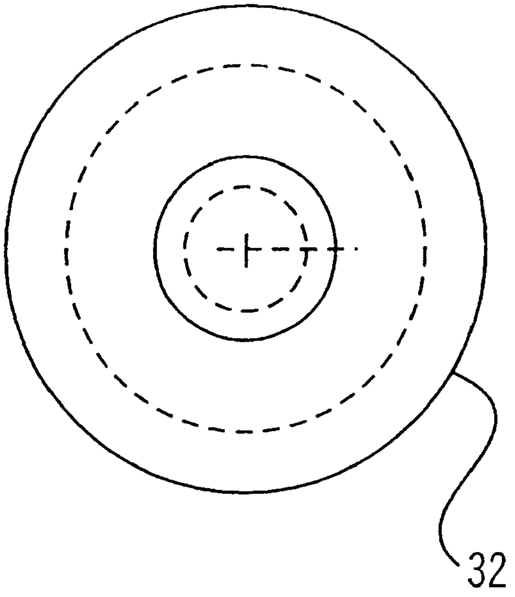
FIGS. 3A and 3B show top and side views, respectively, of a push plate adapter as utilized with the present invention.
Figure 3B:
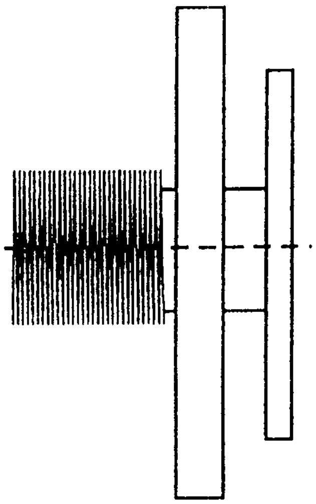

FIGS. 3A and 3B show top and side views, respectively, of a push plate adapter 32 as utilized with the present invention. In one embodiment, there are nine push plate adapters 32 utilized with the nine cylinders 20 of the flue straightener 10. The cylinder to push plate adapter (clevis) 32 are mounted to the push plate 30 of FIG. 2 through the hole dimension 36, the push plates are suitably positioned and the hole slugs 34 are welded and ground smooth.

In operation, the push plates 30 are extended to the bowed or deformed flue wall and the flue wall is pushed back into the normal or desired position. The push plates 30 advantageously distribute forces uniformly throughout the flue wall in order to decrease damage or destruction.

The push plate pushing action also serves a secondary function. Any coke build-up which occurs along the face of the flue wall is fractured through the straightening procedure and the fractured coke falls to the bottom of the bake furnace.

Figure 4:
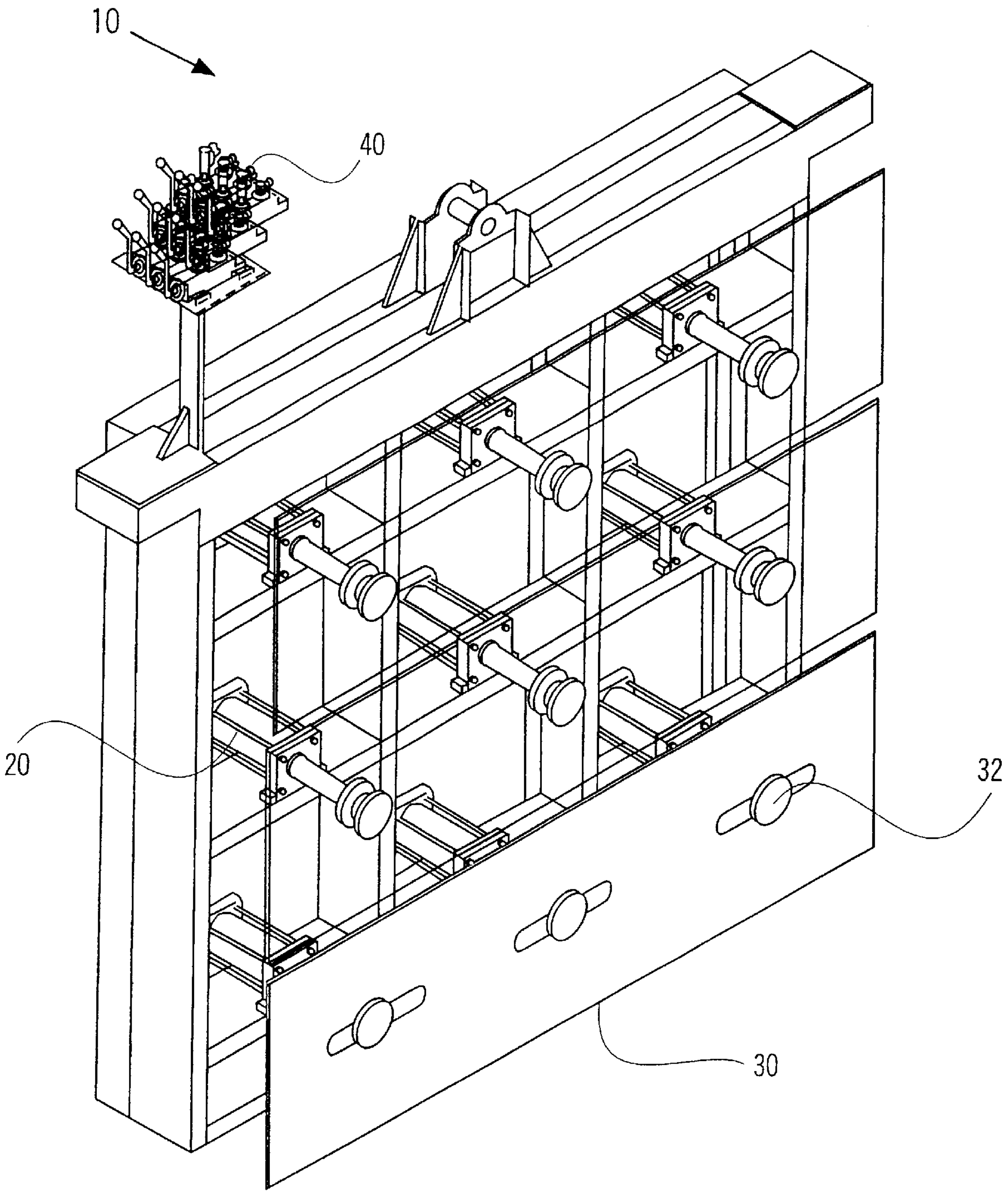
FIG. 4 shows an isometric view of the flue straightener according to the present invention.

FIG. 4 shows an isometric view of the flue straightener 10 according to the present invention. The flue straightener 10 includes nine cylinders 20, which are connected to the push plates 30 through the adapters 32 (three cylinders 32 are associated with a respective push plate 30, as previously described), so that the push plate 30 in FIG. 4 can be selectively pushed or extended to a deformed or defective flue wall, as will be described below. Typically, each group of three hydraulic cylinders 20 can be remotely actuated via suitable controls with hydraulic control 40, so as to extend the respective push plate 30, as seen in FIG. 4.

Figure 5:
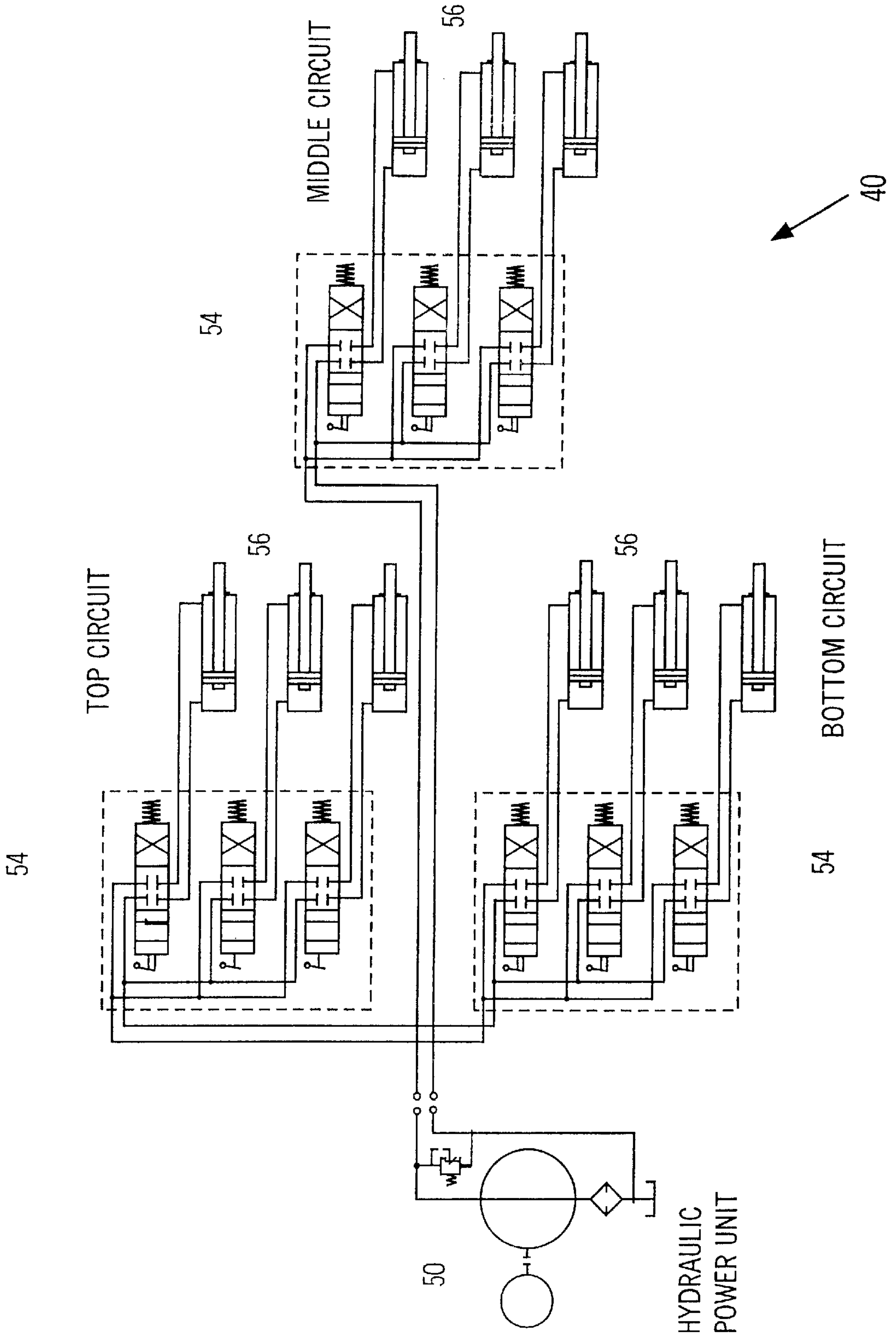
FIG. 5 shows a view of the flue straightener hydraulic control according to the present invention.

FIG. 5 shows a schematic view of the flue straightener hydraulic control system (unit) 40 according to the present invention. In FIG. 5, it would be apparent to one skilled in the art that an operator could selectively control the desired group or group of cylinders 20 of FIG. 4 to enable the desired straightening action of a deformed or defective flue wall, as will now be described.

In one embodiment, the flue straightener hydraulic 40 of FIG. 5 includes the following components:

Hydraulic power unit—7.8 g.p.m. @ 2200 p.s.i., 30 gallon reservoir 9 each—4" diameter hydraulic cylinders 3 each—control valve 3 spool, 3 position, closed center with adjustable relieves 1 lot hydraulic fittings 1 lot hydraulic hose The hydraulic schematic of FIG. 5 shows the hydraulic components and assemblies utilized with the flue straightener 10. The schematic of FIG. 5 incorporates three (3) basic components—a hydraulic power unit, hydraulic cylinders, and the control valves which form the basis of the hydraulic operation. The power unit includes an electric motor, hydraulic pump, hydraulic filters, fluid reservoir, and hydraulic fluid. The electric motor is connected to an electrical source and is controlled by a push button on/off switch to operate or drive the pump. The power unit is connected to the flue straightener 10 via hydraulic hoses which utilize hydraulic quick connecting couplers located on the frame of a valve chest.

As previously described, the flue straightener 10 is arranged into three (3) individual circuits or layers in one preferred embodiment. The top, middle, and bottom circuits 54 of FIG. 5 can be then viewed by the components which make up the working items of the device. Each circuit 54 in FIG. 5 is equivalent to each other and operates in similar fashion.

Each circuit 54 includes a control valve that has a three (3) sections. The sections are independently controlled by self-centering handles. For example, the left handle on the left side of FIG. 5 operates the cylinder 56 on the left, the middle handle operates the middle cylinder 56, and the right handle operates the right cylinder 56 on the right for the particular circuit or layer (top, middle or bottom). The valve is manually actuated by self-centering handles connected to each spool. If a handle is pushed, the cylinder 56 to which it is connected will extend. As the handle is released, it will return to the center position and the extend motion of the cylinder 56 will cease. If the handle is pulled, the cylinder 56 will retract and as the handle is released, it will return to the center position and the motion will cease. Each cylinder 56 is connected to the valve via hydraulic hose.

The control valves 40 in FIG. 4 are mounted to the flue straightener 10 one over the other. Therefore the top or highest control valve controls the top layer or circuit of hydraulic cylinders. The middle valve controls the middle circuit and the lower or bottom valve controls and operates the bottom layer or circuit of cylinders.

The cylinders 20 are mounted to the flue straightener 10 via bolts. The cylinder to push plate mounting clevis 32 are mounted, then the push plates 30 are positioned and the slugs are welded and ground smooth.

In order to illustrate more clearly the novel aspects of the present invention, an illustrative description of the operation of the flue straightener 10 will now be described in conjunction with the straightening of a defective or deformed baking flue. The flue straightener 10 is positioned into a flue pit by an overhead crane. The positioning of the flue straightener 10 is important. The side opposite the push plates must be against a side wall or a flue which has been previously packed or blanketed. Otherwise, it has been found that the possibility of collapsing the opposite flue escalates.

The hydraulic power unit 40 is positioned and the power is connected, as well as connecting hydraulic hoses, via connecting couplings. Once the flue straightener 10 is positioned and the power unit is connected, the flue straightener 10 is ready for operation.

An operator starts the hydraulic unit 40 and begins operation. The operator pushes control levers to extend the cylinders 20 until the push plate(s) 30 contacts the deformed or defective flue. Individual controls enable the push plate 30 to bow or conform to the defective flues. The operator begins to push or extend the cylinders 20 from the center of the bowed flue in an outward direction. The pushing action is continued until the bow or defect has been removed. In many situations, the flue is pushed past the center position and allowed to spring back to the straight or normal position. After the flue has been straightened, all cylinders 20 are retracted to their original position by pulling the control levers. The hydraulic unit 40 is then turned off and the hydraulic lines are disconnected. The flue straightener 10 can then be positioned to the next location.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A flue straightener for straightening a flue wall of an anode baking surface from a deformed or bowed position to a straight or normal position, said flue straightener comprising:

a plurality of individually actuated hydraulic cylinders;

a steel frame for supporting said hydraulic cylinders;

said hydraulic cylinders coupled to a plurality of individually conformable and extendable push plates to extend said push plates to said deformed or bowed position so as to push or straighten said flue wall back to said straight or normal position, a plurality of remotely controlled and independently actuated hydraulic cylinders mounted on a plurality of elevations;

said elevations spaced apart vertically at equal distances from each other, a hydraulic control unit associated with a respective one of each of said elevations for actuating said hydraulic cylinders, each of said elevations of said hydraulic cylinders coupled to an associated push plate so as to push or straighten with equally distributed forces.

2. The flue straightener as in claim 1 wherein straightening the flue wall causes the fracturing of coke build-up on said flue wall such that the fractured coke falls to the bottom of said flue wall.

3. The flue straightener as in claim 2 wherein said elevations include three elevations and wherein said cylinders include nine cylinders, three of which are associated with a respective one of said elevations.

4. The flue straightener as in claim 3 including a lifting assembly affixed to the top of said straightener to facilitate in the lifting and positioning of said straightener with said deformed or bowed position.

5. The flue straightener as in claim 1 further comprising:

headwall and suspend structural means for spacedly supporting said steel frame for providing controlled clearances for the flue straightener from a headwall and a bottom of the flue wall.

6. The straightener of claim 1 further comprising:

said push plates being individually horizontally rotatable by said independently actuated hydraulic cylinders for aligning said push plates to said flue wall.

7. The straightener of claim 1 further comprising:

said push plates being operable in unison for pushing on said flue wall.

8. A flue straightener for straightening a bake carbon flue wall from a deformed or bowed position to a straight or normal position, said straightener comprising:

at least one plurality of horizontally disposed hydraulic cylinders, said plurality of horizontally disposed hydraulic cylinders with at least one vertically disposed elevation, said horizontally and vertically disposed cylinders being spaced apart for positioning the cylinders to a deformed or bowed position on the wall requiring straightening, a hydraulic control unit associated with a respective each one of said elevations for actuating said hydraulic cylinders individually or in unison for aligning to and pushing on said deformed or bowed position of said flue wall, a steel frame for supporting said hydraulic cylinders at said deformed or bowed position, each said plurality of horizontally disposed hydraulic cylinders coupled to a plurality of extendable push plates for extending said push plates to said deformed or bowed flue wall to push or straighten said deformed or bowed flue wall to said straight or normal position.

* * * * *